United States Patent [19]

Lentz et al.

[11] Patent Number: 5,375,827
[45] Date of Patent: Dec. 27, 1994

[54] FEEDING APPARATUS FOR METAL SHEETS

[75] Inventors: Norbert Lentz, Essen; Harald Schmidt, Langerwehe, both of Germany

[73] Assignee: Krupp Maschinentechnik Gesellschaft mit beschräkter Haftung, Essen, Germany

[21] Appl. No.: 42,407

[22] Filed: Apr. 2, 1993

[30] Foreign Application Priority Data

Apr. 7, 1992 [DE] Germany ............... 4211658

[51] Int. Cl.⁵ .................................. B65H 5/16
[52] U.S. Cl. ................... 271/270; 271/271; 271/69; 271/203
[58] Field of Search ........... 271/270, 271, 203, 202, 271/69; 198/461, 577, 732

[56] References Cited

U.S. PATENT DOCUMENTS

| | | |
|---|---|---|
| 1,868,707 | 7/1932 | Hothersall . |
| 2,355,079 | 8/1944 | Jones . |
| 2,484,845 | 10/1949 | Nordquist et al. . |
| 2,547,964 | 4/1951 | Nordquist et al. . |
| 2,554,095 | 5/1951 | Diezel . |
| 2,623,746 | 12/1952 | Gegenheimer et al. . |
| 2,769,528 | 11/1956 | Goodrich et al. . |
| 3,075,630 | 1/1963 | Fisk . |
| 3,153,533 | 10/1964 | Novick ............... 271/271 X |
| 3,827,545 | 8/1974 | Buhayar . |
| 4,456,117 | 6/1984 | Szczepanski . |
| 4,586,612 | 5/1986 | Oberg . |
| 4,632,381 | 12/1986 | Cuir et al. ............ 271/270 |
| 4,682,684 | 7/1987 | Löthman . |
| 4,775,044 | 10/1988 | Hofling ............... 198/331 X |

FOREIGN PATENT DOCUMENTS

| | | |
|---|---|---|
| 385488 | 4/1988 | Austria . |
| 0095955 | 12/1983 | European Pat. Off. . |
| 1490870 | 6/1967 | France . |
| 1575006 | 7/1969 | France ............... 198/331 |
| 868751 | 2/1953 | Germany . |
| 1756783 | 9/1970 | Germany . |
| 2201823 | 1/1973 | Germany . |
| 2145339 | 3/1973 | Germany . |
| 2425948 | 12/1974 | Germany . |
| 2702150 | 7/1977 | Germany . |
| 2724980 | 11/1978 | Germany . |
| 2849255 | 5/1979 | Germany . |
| 3150045 | 6/1983 | Germany . |
| 9105495 | 10/1991 | Germany . |
| 62-249845 | 10/1987 | Japan ............... 271/270 |
| 91/06408 | 5/1991 | WIPO . |

*Primary Examiner*—David H. Bollinger
*Attorney, Agent, or Firm*—Spencer, Frank & Schneider

[57] ABSTRACT

A sheet feeding apparatus includes a first feeding device having an endless traction member circulated at a constant speed and a carrier pawl mounted on the traction member for engaging a trailing edge of a sheet to be advanced. The apparatus further has a second feeding device being a continuation of the first feeding device and having an endless traction member; a carrier device mounted on the second traction member for engaging a trailing edge of a sheet to be advanced; and a drive for circulating the last-named traction member with a periodically changing travelling speed having a minimum value not higher than the speed of the traction member of the first feeding device and a maximum value greater than the speed of the traction member of the first feeding device and at the most equal to an initial speed with which the sheet enters a sheet handling station downstream of the second feeding device. The initial speed is at least as high as the constant speed of the traction member of the first feeding device. The carrier device is situated on the upper run of the traction member of the second feeding device at the end of an acceleration phase of the periodic speed change.

6 Claims, 7 Drawing Sheets

FEEDING APPARATUS FOR METAL SHEETS

CROSS REFERENCE TO RELATED APPLICATION

This application claims the priority of German Application No. P 42 11 658.9 filed Apr. 7, 1992, which is incorporated herein by reference.

BACKGROUND OF THE INVENTION

This invention relates to a sheet feeding apparatus which includes a sheet advancing (traction) member provided with carrier pawls and circulating at a constant speed for conveying the sheets to a working station in which they arrive with an initial velocity which is at least as high as the circulating speed of the carrier pawls.

The traction member of the feeding apparatus may include traction chains. Material to be handled generally consists of metal sheets or strips or may be crosscut pieces. A typical working station into which the sheets are introduced comprises a roller knife cutter in which the throughput velocity remains constant and corresponds to the initial velocity. The initial velocity, in turn, with which the sheets are drawn into the working station must in no event be less than the advancing velocity, otherwise a buckling of the sheet material will occur. In practice, the initial velocity of the working station is selected to be slightly greater than that of the feeding apparatus.

Roller knife cutters sever the metal sheets, such as tin-plated iron sheets used for sheet packages, into strips in a first operation and into crosscut pieces in a second operation. Known feeding apparatus for metal sheets and also for crosscut pieces include a chain-type feeding apparatus whose circulating speed is smaller than the circumferential or intake speed of the roller knife cutter. For the parallel alignment and acceleration of the metal sheets or strips approximately to the circumferential speed of the roller knife cutter, downstream of the feeding apparatus (as viewed in the direction of material feed) a pawl feeding device with linearly reciprocating pawl pushers is arranged.

The throughput of the roller knife cutter is determined essentially by the stroke, the mode of operation and the stroke frequency of the oscillating pawl pusher drive. If, for example, the pusher drive executes seven strokes per sheet, then for a delivery of forty sheets per minute there are needed 280 strokes per minute for a stroke of approximately 100 mm. It is a disadvantage of such a prior art construction that extremely high accelerations and inertia forces may appear. The earlier-noted sheet delivery itself may be achieved only with high manufacturing precision and with sheet material which is of light weight. In any event, the pusher drive is, because of the high inertia forces, exposed to a very significant wear and also generates substantial noise.

SUMMARY OF THE INVENTION

It is an object of the invention to provide an improved feeding apparatus of the above-outlined type with which, as compared to prior art constructions, a higher output (sheet per minute) may be achieved for given wear and noise values or a lesser wear and noise may be obtained for a given output.

This object and others to become apparent as the specification progresses, are accomplished by one solution of the invention, according to which, briefly stated, in the zone of a first feeding device a second feeding device is provided which has a circulating traction member which is driven by a drive mechanism and which has a carrier assembly situated transversely to the feeding direction. The carrier assembly reaches in the zone of the upper run of the traction member, at least at a point in time, a speed which is greater than or equal to the circulating speed of the first feeding device and attains, at this or at another point in time, a speed which is less than or equal to the initial velocity in the working station.

The object of the invention is, in a second solution additionally achieved, on the one hand, by advancing the circulating traction member of the second feeding device by the drive means with a periodically variable circulating speed, whose minimum is less than or equal to the circulating speed of the first feeding device and whose maximum is greater than the circulating velocity of the first feeding device and is less than or equal to the initial velocity in the working station and further, the carrier assembly is, at least at the end of the acceleration phase, situated in the zone of the upper run.

During the end phase of the acceleration, the carrier assembly of the second feeding device overtakes the carriers of the first feeding device. During this occurrence, the carrier assembly of the second feeding device engages the trailing end of the sheet and moves the same from the originally engaging carrier pawl of the first feeding device away in the forward direction. During further acceleration, the carrier assembly of the second feeding device attains approximately the velocity of the working station, for example, the (constant) rotary speed of the knife bodies of a roller knife cutter. After the working station (that is, the roller knife cutter) has taken over the metal sheet, the circulating speed of the second feeding device is reduced until a minimum velocity is reached, whereby a distance between the metal sheet and the carrier pawls is obtained.

The object of the invention is, on the other hand, additionally achieved by providing the carrier assembly with carrier pawls which, before the transition from the linear motion in the upper run into the curved (circular) motion toward the lower run assume a retracted position underneath the transporting plane of the metal sheets at least until an initial phase of the curved run.

The carrier pawls of a traction member necessarily project in height beyond the traction member for advancing the sheet. Upon transition from the linear motion of the upper or lower run into the circular deflecting motion, the upper edge of the carrier pawl is, because of the height difference, more rapidly moved than the circulating speed of the traction member. The metal sheet pushed by the feeding apparatus is thus submitted in the transitional zone to an unwanted acceleration which may result in a buckling of the sheets, or in extreme cases may causes damages thereto.

The feeding apparatus designed according to the second solution is advantageous in that the second feeding device may be operated with a constant circulating speed even if the circulating speed equals the initial velocity (or, in general, the constant velocity) of the working station.

While the two solutions according to the invention may achieve the objects of the invention essentially independently from one another, a combination of the two solutions leads to further improvements. Thus, in such a combination, for example, the maximum value of a periodic velocity of the carrier pawls of the second feeding device may be displaced to the deflection point.

A periodically variable circulating speed of the carrier assembly of the second feeding device is effected preferably by a cardan joint, by means of which the second feeding device is coupled to its drive. While the pulsating deviation from a precise circular run in a cardan joint is generally considered as an adverse phenomenon, the effect of the cardan joint in the present instance is utilized intentionally for achieving a desired result.

While in the Z-shaped arrangement of a cardan shaft whose axes of articulation or joint forks lie in a common plane, the pulsation is compensated for, such pulsation is intensified if between the axis of the second feeding device and the shaft of the drive a second cardan joint is arranged and further, the axis of the second feeding device, the jointed shaft arranged between the cardan joints and the axis of the drive have a Z-shaped arrangement and the cardan joints of the jointed shaft or their joint forks are oriented at 90° to one another.

To ensure that the carrier pawls of the second feeding device may assume a position underneath the transporting plane of the metal sheets, the carrier pawl is supported in a pawl holder which, in turn, is supported on the circulating traction member for a pivotal motion about a horizontal frontal axis and is spring-biased in the direction towards the middle of the traction member. A torque is exerted on the pawl holder by a stationary guide track which in the zone of the upper run has a course which is parallel to the feeding plane of the metal sheets and prior to the transition into the circular travel path leading to the lower run, the guide track is situated at a distance from the feeding plane.

DESCRIPTION OF THE PREFERRED EMBODIMENTS

Figure 1:
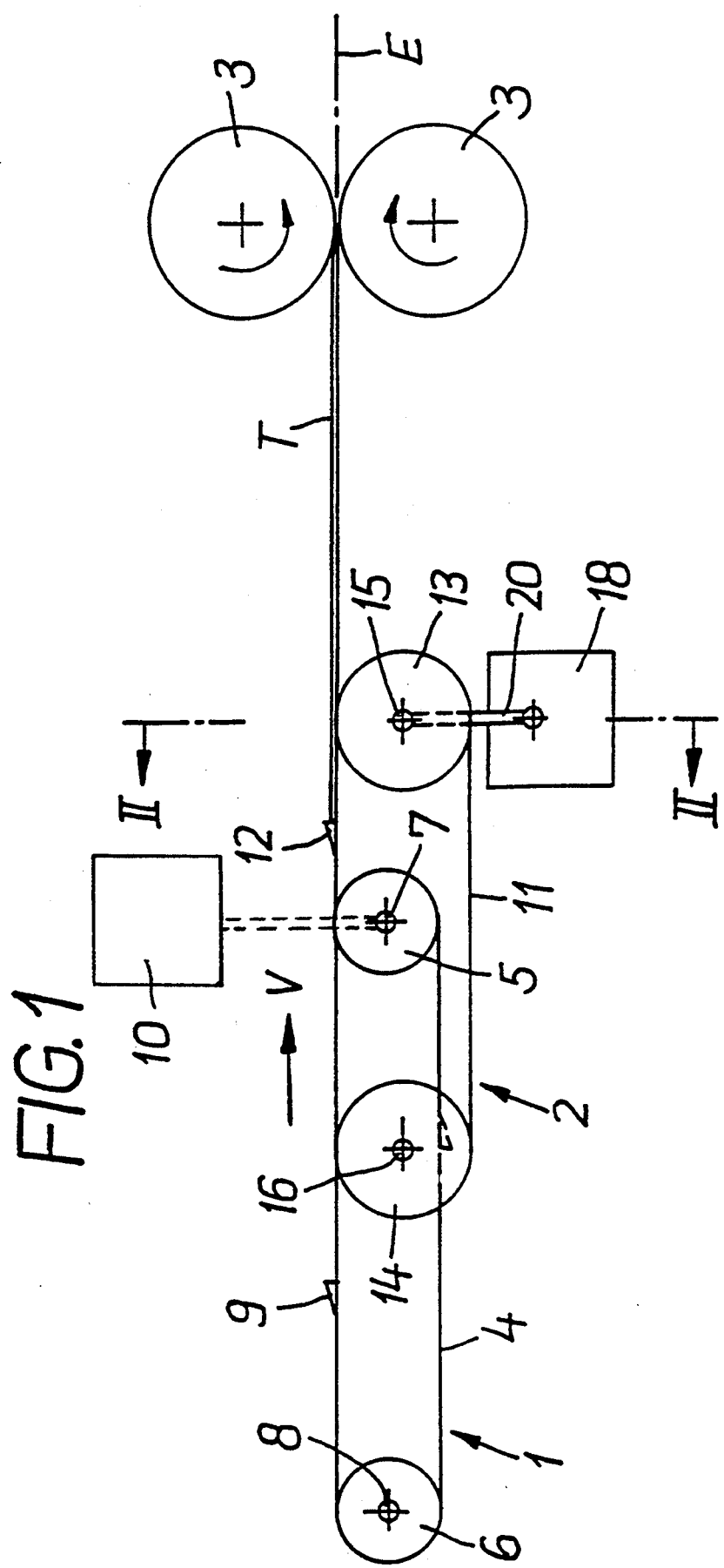
FIG. 1 is a schematic side elevational view showing the principal structure of a feeding apparatus according to the invention.

Turning to FIG. 1, the feeding apparatus according to the invention has a first and a second feeding device 1 and 2, respectively, which have overlapping length portions as viewed in the feeding direction V. A pair of roller knife cutters 3 is arranged downstream of the end of the second feeding device 2.

The first feeding device 1 has two laterally spaced endless chains 4 (only one is visible) each supported by a frontal (downstream) and rear (upstream) sprocket 5 and 6, respectively. The frontal and rear sprockets 5 and 6 are supported on respective shafts 7 and 8. The frontal shaft 7 is conventionally connected with a drive 10 which circulates the chains 4 at a constant, settable velocity.

Dependent upon the length of the metal sheets T, each chain 4 carries one or more pawls 9 in pawl pairs, viewing the two chains 4 together. The pawls of each pawl pair are in alignment with one another in a direction perpendicular to the feeding direction V.

The second feeding device 2 includes two laterally spaced toothed belts 11 (only one is visible) each trained about a frontal and a rear sprocket 13 and 14, respectively and each carrying a carrier pawl 12. The sprockets 13 and 14 are arranged in pairs on common frontal and rear shafts 15 and 16, respectively. The rear shaft 16 is situated between the shafts 7 and 8 of the first feeding device 1, whereas the frontal shaft 15 is positioned between the first feeding device 1 and the roller knife cutters 3. The second feeding device 2 is so structured that the two carrier pawls 12 are in alignment parallel to the shafts of the roller knife cutters 3.

Figure 2:
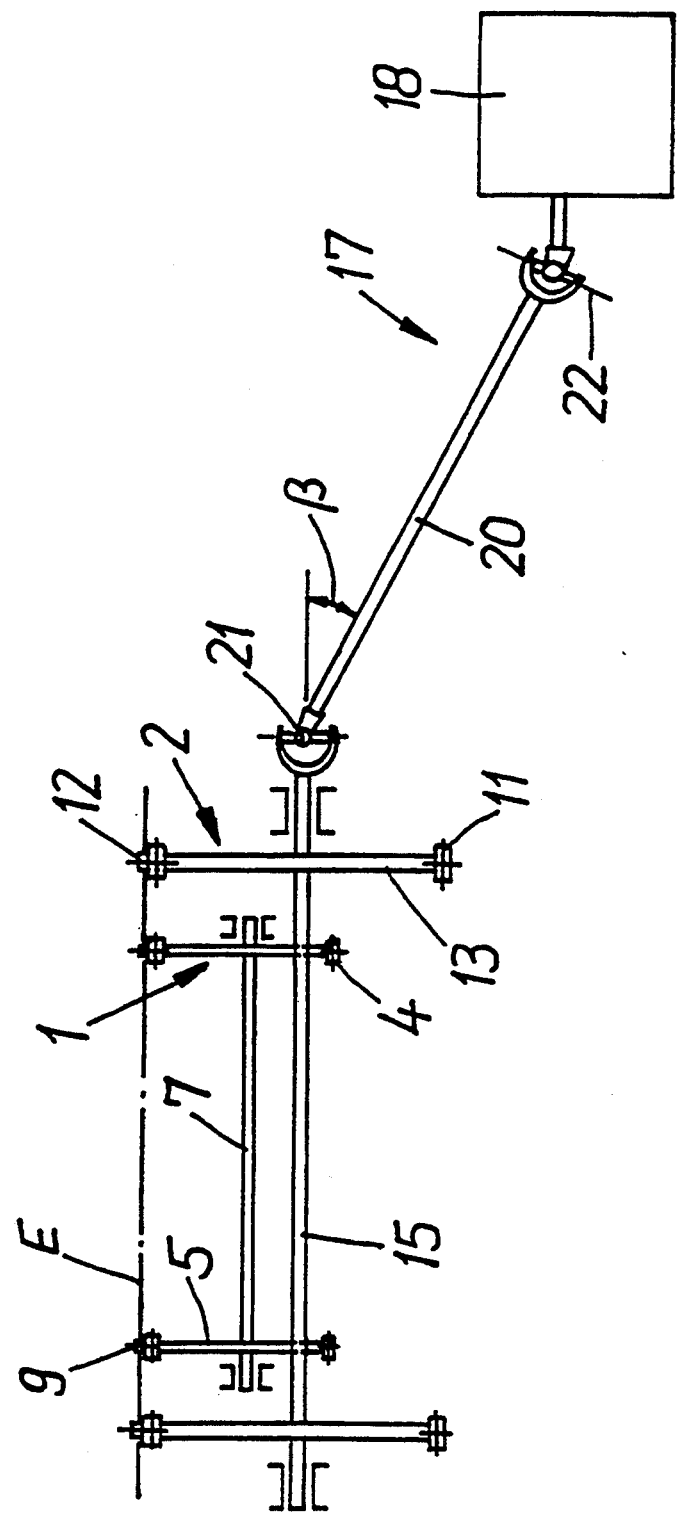
FIG. 2 is a schematic sectional view taken along line II—II of FIG. 1 showing a preferred embodiment of the second feeding device of the feeding apparatus, connected to its drive by a cardan shaft.

The upper run of the toothed belt 11 is situated at the same height level as the upper run of the chain 4. Also referring to the front elevational view of FIG. 2, the two belts 11 flank the chains 4. The frontal shaft 15 is connected by means of a Z-shaped cardan shaft assembly 17 with a drive 18 which may be set to a constant rpm n0 or a constant angular velocity $\omega 0$. The cardan shaft 20 proper, formed as a spline profile shaft coupling is inclined at an angle $\beta$ relative to the shaft 15 and the shaft of the drive 18. The forks or transversal axes 21, 22 of the cardan shaft 20 are—as a departure from conventional arrangements—oriented at 90° relative to one another. Stated differently, while the left-hand cardan joint axis 21 extends perpendicularly to the plane of the drawing of FIG. 2, the axis 22 at the opposite end of the cardan shaft 20 lies in the plane of the drawing. By virtue of this arrangement the sprockets 13 on the shaft 15 are driven by an irregular angular velocity $\omega 15 = \omega 13$ pulsating with $2\omega 0$, while the toothed belts 11 have, together with the carrier pawls 12, a corresponding pulsating circulating speed $v11 = v12$.

The angular velocity $\omega 13$ and $\omega 15$ for a shaft connected with a cardan joint is, according to Dubbel's Taschenbuch für den Maschinenbau (Handbook of Machine Construction) 15th Edition, Berlin, Heidelberg, New York, Tokyo; published by Springer in 1983, page 409, paragraph 4.2.2, $$\omega 13 = \omega 15 = \omega 0 \cdot \cos \beta / (1 - \sin^2 \beta \cos^2 \alpha)$$

wherein $\alpha$ is the rotary angle of the shaft of the drive 18.

By virtue of the Z-shaped design of the cardan shaft assembly 17 and the described orientation (angular offset) between the cardan joints 21 and 22 of the shaft 20, the amplitude of the deviation of the angular velocity $\omega 13$ and $\omega 15$ from the angular velocity $\omega 0$ of the drive 18 doubles relative to a single cardan joint.

Figure 3:
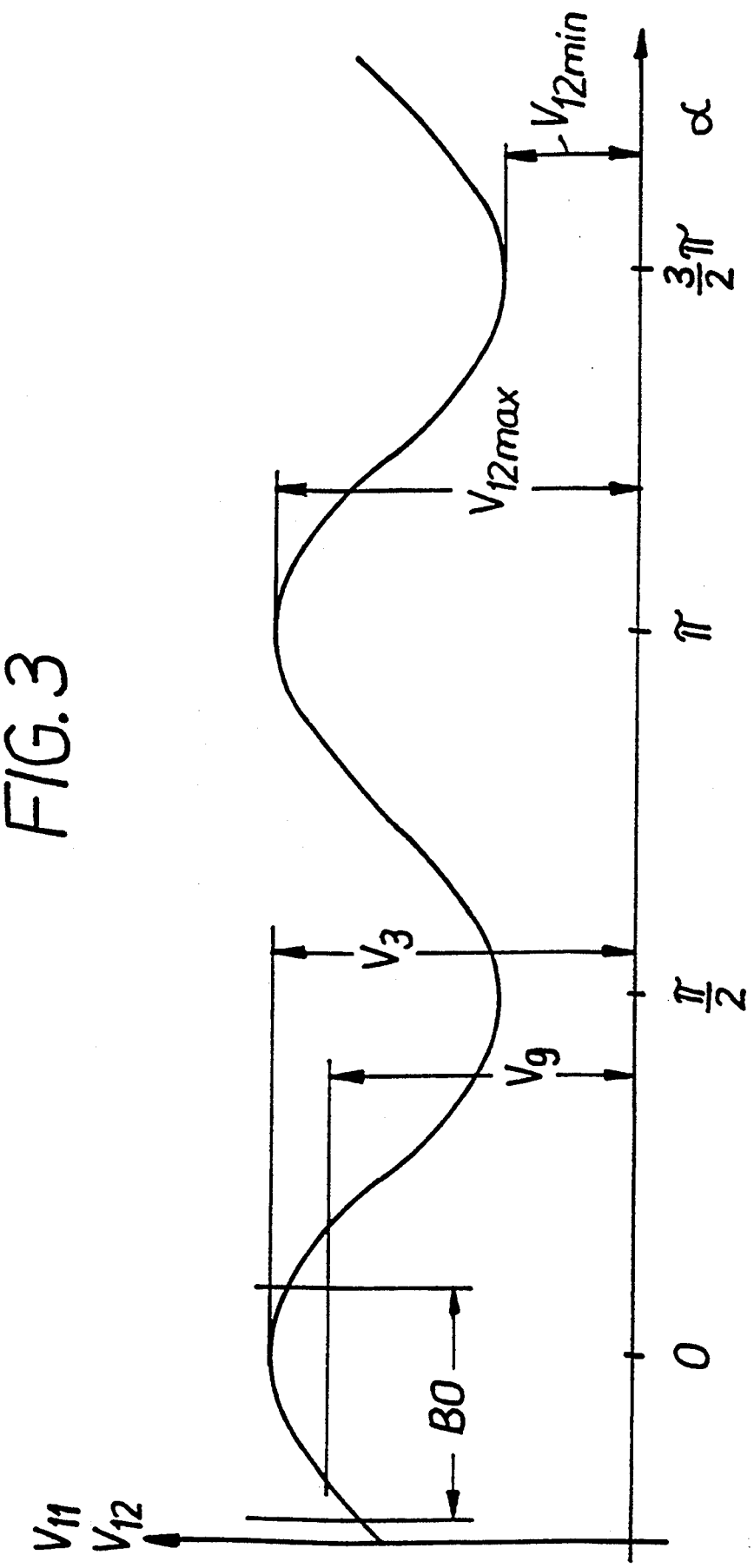
FIG. 3 is a diagram illustrating the circulating speed of the second feeding device as a function of the rotary angle of the drive during one revolution of the drive.

In FIG. 3, the circulating speed $v12$ of the carrier pawl arrangement which is formed of the two carrier pawls 12 and which is proportional to the angular velocity $\omega 13$ and $\omega 15$ is illustrated for one revolution of the shaft of the drive 18.

During one revolution of the shaft of the drive 18 the circulating speed v12 passes through two maximum and two minimum values. BO designates the zone in which the carrier pawls 12 move in the upper run. Within this zone the circulating speed v12 constantly increases. In a short period of time, the carrier pawls 12 are accelerated to the constant speed v9 of the pawls 9 of the first feeding device. The two feeding devices 1 and 2 are set in such a manner that the pawls 12, at the time they have the same circulating speed as the pawls 9 (v9=v12), assume with the pawls 9 the same position in the feeding direction V. As it may be further observed in FIG. 3, the circulating speed from this point on is further accelerated: the pawls 12 leave the pawls 9 behind and thus take over the feed of the metal sheets T. The maximum of the speed v12 is so designed that it corresponds to the circumferential speed v3 of the roller knife cutters 3.

The second feeding device 2 is so designed that the pawls 12, upon reaching the greatest speed v12max=v3 have a distance from the roller knife cutters 3 which essentially corresponds to the length of one metal sheet or one strip width. In the state of the greatest speed v12max or shortly therebefore the metal sheet is grasped by the pair of roller knife cutters 3 and pulled from the feeding device 2, as shown in FIG. 1. Upon reaching the maximum speed, the toothed belts 11 carrying the pawls 12 are again decelerated and the distance between the metal sheet pulled by the roller knife cutters 3 and the pawls 12 increases visibly. During the deceleration of the speed v12 the pawls 12 travel about the sprockets 13 and, during this occurrence, they reach a minimum speed v12min and then they are again accelerated and pass through the zone of the lower run, then they are again decelerated and travel circularly about the sprockets 14 and accelerated for the successive cycle.

It is of decisive importance in the second feeding device 2 that the carrier pawls 12 in the zone of the upper run are accelerated from a speed below the circulating speed of the first feeding device 1 to the circumferential velocity of the roller knife cutters 3 and that the carrier pawls 12, at the circulating speed of the first feeding device 1, essentially assume the same feeding position as the pawls 9 and during the speed v3 have a distance from the roller knife cutters 3 which corresponds to the length of the metal sheet.

A similar non-uniform circulating speed may be achieved by an indexing platform-type drive or by an NC-controlled servodrive.

Turning now to FIGS. 4–8, in the embodiment illustrated therein the second feeding device 30 has on each side a circulating traction member, each formed of a toothed belt 31 carrying a pawl assembly 32. The endless toothed belts 31 are supported and deflected by frontal and rear sprocket units 33 and 34, respectively. One of the sprocket units, for example, the sprocket unit 33 is—synchronously with the other side—driven with a constant, settable speed so that the pawl assembly 32 travels with a constant circulating speed v32. The circulating speed v32 is greater than the circulating speed of the first feeding device 1 and is slightly below the circumferential speed of the roller knife cutters 3.

The feeding device 30 is so structured that the two pawl assemblies 32 which constitute the carrying device, are aligned parallel to the shafts of the roller knife cutters 3.

The pawl assembly 32 includes a pawl holder 35 and a carrier pawl 36. The cross-sectionally U-shaped pawl holder 35 is at its frontal end articulated to a pin 37 which, in turn, is held in two pin holders 38 vulcanized onto each toothed belt 31. In the zone of the pawl assembly 32 the toothed belt 31 has a recess 39 into which the pawl assembly 32 extends. The pawl holder 35 is pressed by a coil spring 40, wound around the pin 37, from the toothed belt 31 in the direction of the other belt run into the space within the toothed belt. In order to ensure that such a motion of the pawl holder 35 occurs in a controlled manner, in the zone of the upper and lower run—on each side of the feeding device 2—between the sprocket units 33 and 34 shaped components 41 and 42 are arranged on which the underside of the pawl holder 35 slides.

The upper shaped component 41 has a slide track 43 which starts from the rear sprocket 34 and extends parallel to the feeding plane E. In the zone of the frontal sprocket unit 33 the upper shaped component 41 has a slide track 44 which is situated at a lower level than the slide track 43 and which forms an upper surface of a tongue-like part 45 of the upper shaped component 41. The slide track 43, in turn, forms the upper surface of a tongue-like part 46 of the shaped component 41.

Figure 5:
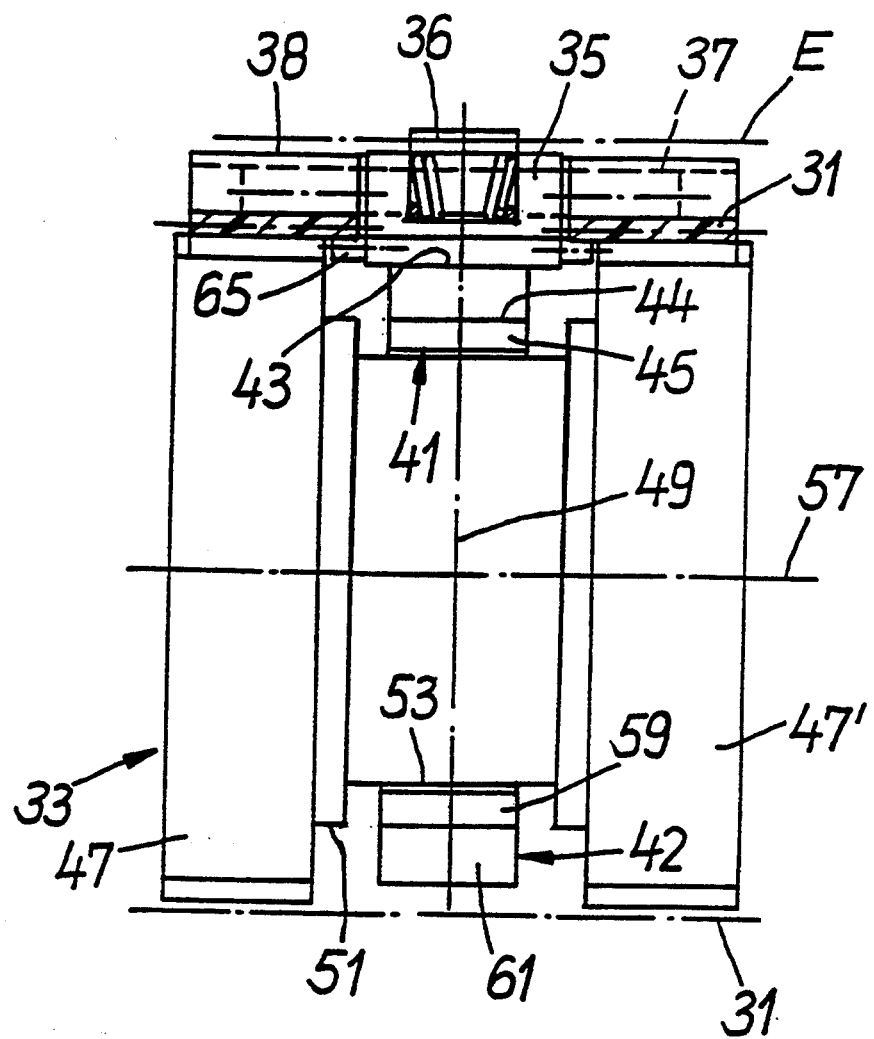
FIG. 5 is a front elevational view of the construction shown in FIG. 4; the toothed belt is partially omitted.

Also referring to FIG. 5, each sprocket unit 33 and 34 has two outer sprockets 47, 47' joined in the direction of the common central plane 49 by attachments 51 and a central recess 53. The central recess 53 has a width to accommodate the tongues 45 and 46 of the upper shaped component 41. The radius of the attachments 51 corresponds to the distance of the slide track 44 from the shaft 57 of the sprocket unit 33 in the transitional plane 55.

The lower shaped component 42 has tongues 59 and 60 which are similar to the tongues 45 and 46. The tongue 59 is situated in the recess 53 of the sprocket unit 33, whereas the tongue 60 is disposed in a corresponding recess of the sprocket unit 34. Both tongues 59 and 60 have a common, continuous slide track 61. In the transitional plane 55 the slide track 61 has, corresponding to the radius of the attachments 51, the same distance from the shaft 57 of the sprocket unit 33 as the slide track 44. At its end, in the transitional zone 56, the slide track 61 has the same distance from the shaft 58 of the sprocket unit 34 as the slide track 43.

The shaped components 41, 42 are secured to the non-illustrated machine frame by screws 63, 64.

Figure 4:
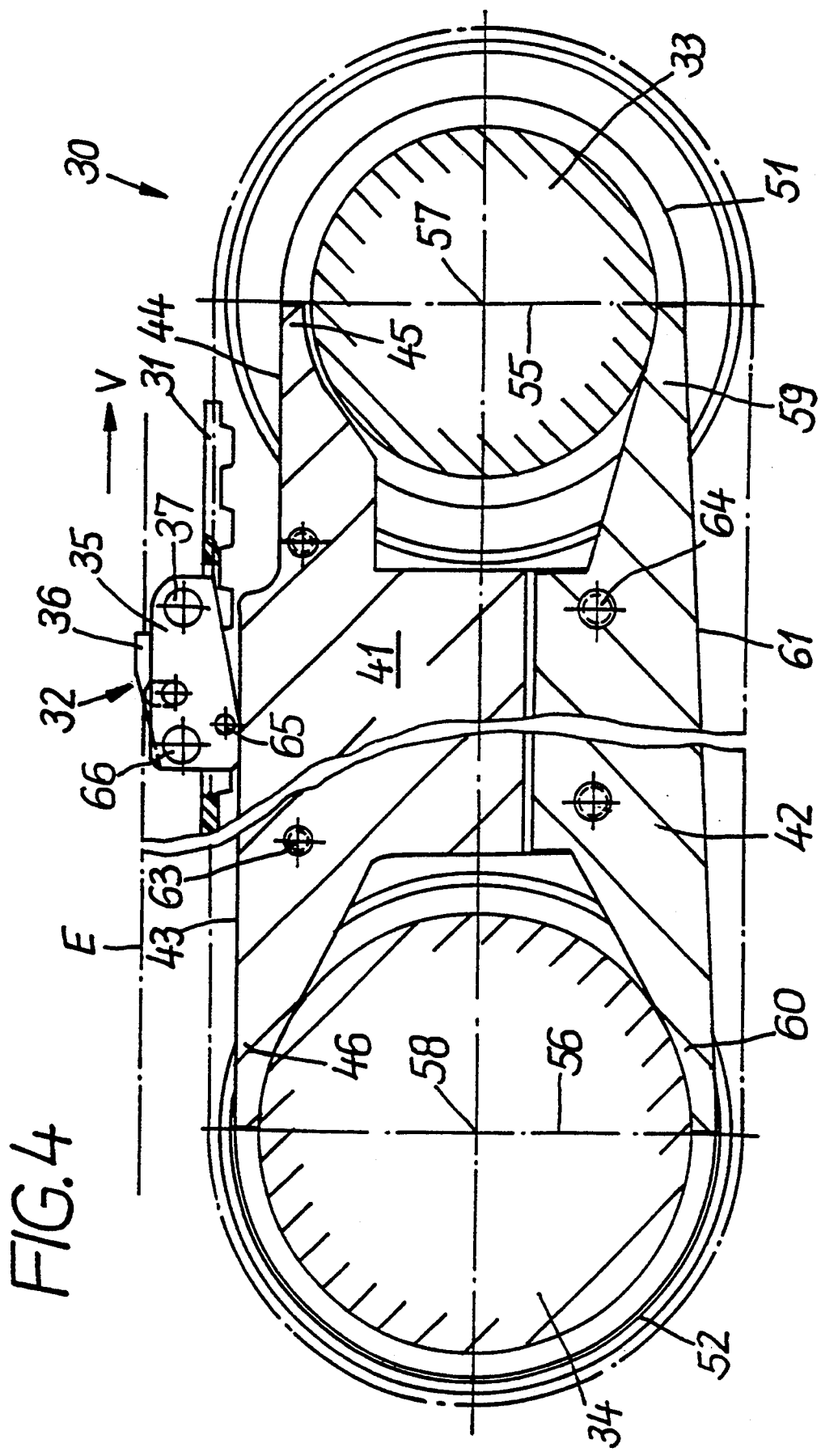
FIG. 4 is a sectional side elevational view of another preferred embodiment of the second feeding device according to the invention.
Figure 6:
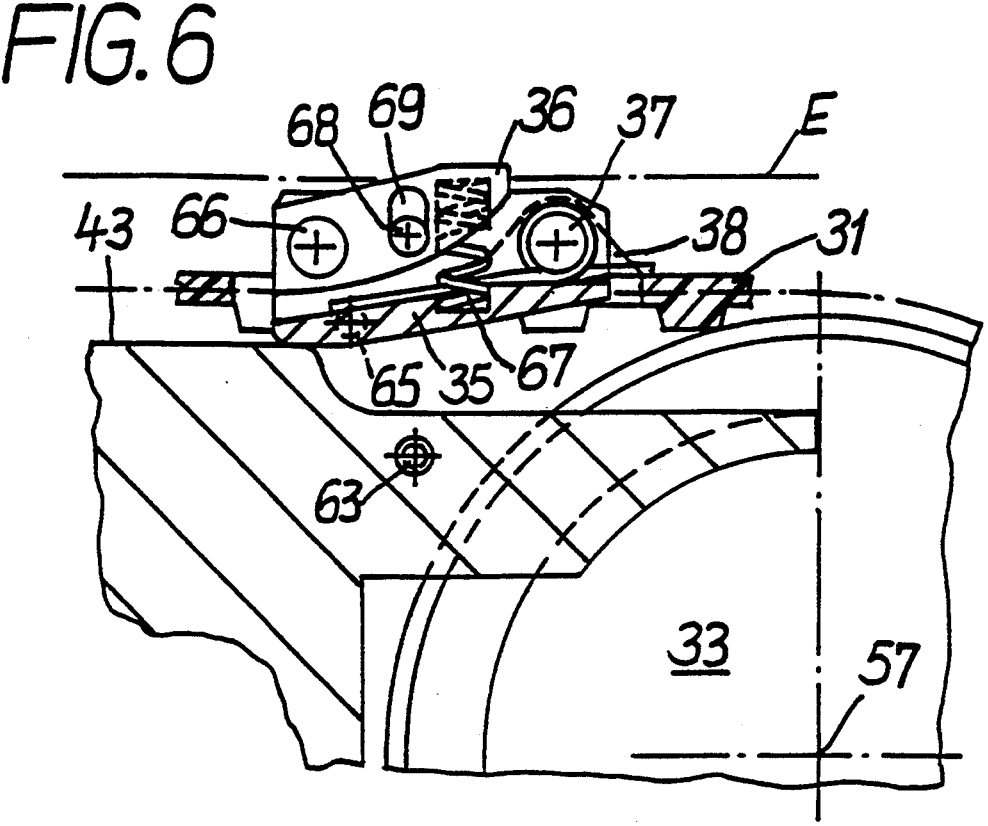
FIG. 6 is a partially sectional side elevational view of a detail of the construction shown in FIG. 4.
Figure 7:
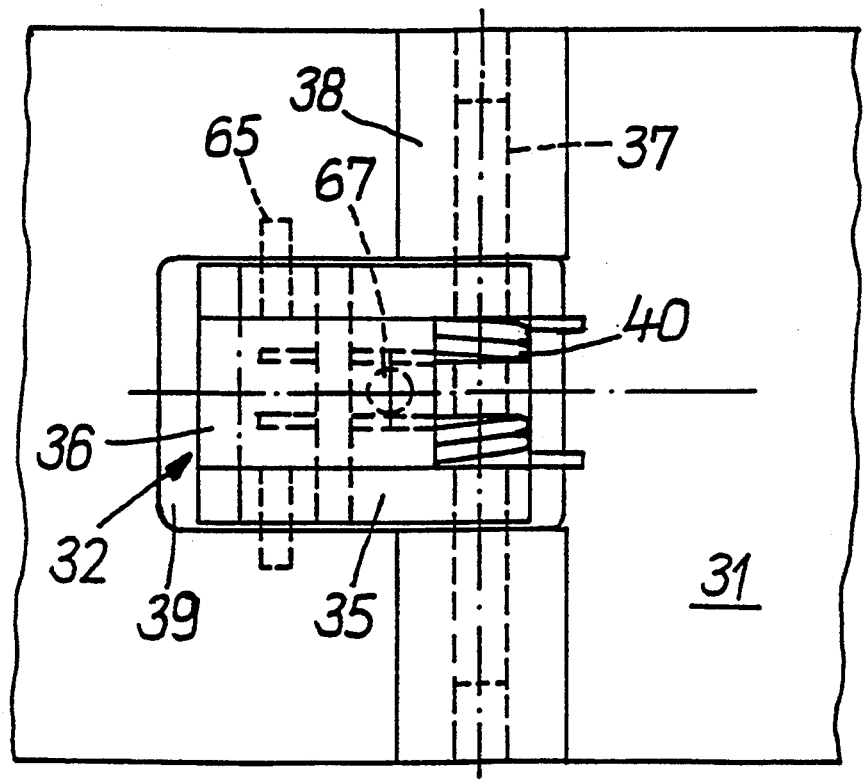
FIG. 7 is a top plan view of the construction shown in FIG. 6.
Figure 8:
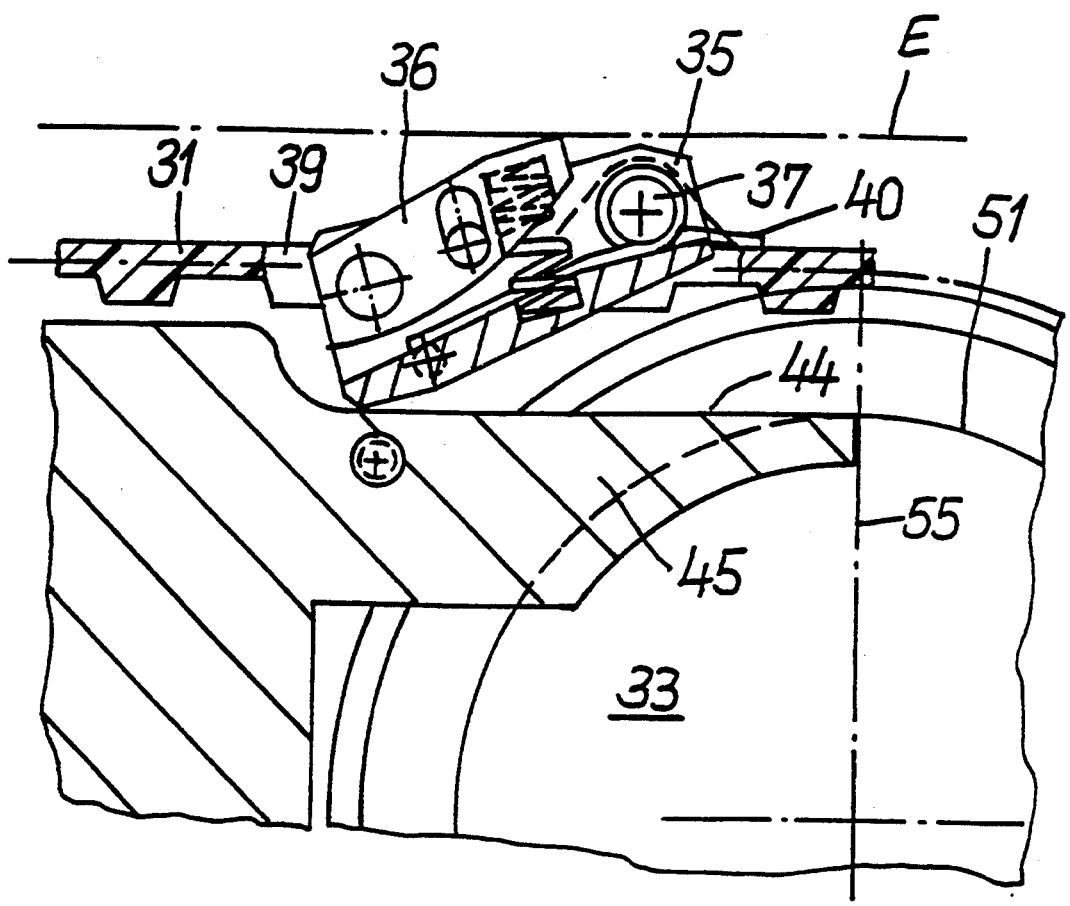
FIG. 8 is a sectional side elevational view similar to FIG. 6, depicted shortly prior to deflection to the lower run.

During one revolution, the underside of the pawl holder 35 of the pawl assembly 32 of each toothed belt 31 first slides on the slide track 43 as shown in FIGS. 4, 5 and 6. The spring 40 presses the pawl holder 35 away from the toothed belt 31 in the downward direction and the pawl holder 35 thus slides with its underside on the slide track 44 (FIG. 8) shortly before deflection about the sprocket unit 33. In this position the carrier pawl 36 is retracted underneath the transporting plane E in which the metal sheets T are to be conveyed. Upon deflection (that is, upon the circular travel about the sprocket unit 33) the pawl holder 35 is supported by lateral pins 65 on the extensions 51 of the sprocket unit 33. In the zone of the lower run the pawl holder 35 slides on the slide track 61 and the entire pawl assembly 32 is continuously outwardly pressed on the steadily rising slide track 61. Upon deflection to the zone of the upper run the pawl holder 35 lies, by means of the pins 65, on the lateral attachments 52 of the sprocket unit 34 and there thus occurs a jar-free transition onto the slide track 43.

A fixed pawl projecting beyond a traction member has in the zone of its deflection (circular travel) a greater velocity—corresponding to its distance from the deflection axis—than the circulating speed of the traction member. When a metal sheet is moved with the circulating speed of the traction member, in the transitional zone from a linear travel of the pawl into a circular travel the sheet would be either correspondingly accelerated or—in case the sheet is pulled with constant velocity—it would be buckled. The above-described embodiment of FIGS. 4–8 prevents such an occurrence even at constant circulating speed, because the carrier pawls 36 are retracted in the feeding direction V and also in their height by the drop or dip of the pawl holder 35.

The pins 65 also serve to protect against an outward hurdling of the pawl assembly 32 from the opening 39 in case of significant centrifugal forces. The lateral pins 65 lie on the underside of the toothed belt 31; at the respective location the tooth of the toothed belt is removed.

In order to ensure that the carrier pawls 35 may move out of the way of an overtaking metal sheet, they are supported to move about a pin 66 of the pawl holder 35. A compression spring 67 presses the feeding edge of the pawls 36 outwardly. The limit position of the carrier pawls 36 is determined by a pin 68 held in the pawl holder 35 and extending into a slot 69 provided in each carrier pawl 36.

It will be understood that the above description of the present invention is susceptible to various modifications, changes and adaptations, and the same are intended to be comprehended within the meaning and range of equivalents of the appended claims.

What is claimed is:

1. A feeding apparatus for advancing sheets in a feeding plane and in a feeding direction to a sheet handling station situated downstream of the feeding apparatus; the feeding apparatus comprising
    (a) a first feeding device including
        (1) a first endless traction member having an upper run and a lower run;
        (2) first end rollers supporting said first traction member; one of said first and second end rollers including a driven shaft;
        (3) a carrier pawl mounted on said first traction member for engaging a trailing edge of a sheet and advancing the sheet in the feeding direction; and
        (4) first drive means for circulating said first traction member and said carrier pawl at a constant speed; and
    (b) a second feeding device being a continuation of said first feeding device and having an end situated downstream of said first feeding device as viewed in said feeding direction; said second feeding device including
        (1) a second endless traction member having an upper run and a lower run;
        (2) second end rollers supporting said second traction member;
        (3) a carrier device mounted on said second traction member for engaging a trailing edge of a sheet and advancing the sheet in the feeding direction into the sheet handling station; and
        (4) a second drive means for circulating said second traction member and said carrier device with a periodically changing travelling speed having a minimum value at the most equal to said constant speed of said first traction member and a maximum value greater than said constant speed of said first traction member and at the most equal to an initial speed with which the sheet enters the sheet handling station; said initial speed being at least as high as said constant speed of said first traction member; said carrier device being situated on the upper run at the end of an acceleration phase of the periodic speed change; said second drive means including a cardan shaft and a cardan joint coupling said cardan shaft to said driven shaft; said cardan shaft driving said driven shaft; and said driven shaft being oriented at an acute angle to said cardan shaft.

2. The feeding apparatus as defined in claim 1, wherein said cardan joint is a first cardan joint having a first joint fork affixed to said cardan shaft; said second drive means further comprising a drive motor including a drive shaft and a second cardan joint coupling said cardan shaft to said drive shaft; said second cardan joint having a second joint fork affixed to said cardan shaft; said driven shaft, said cardan shaft and said drive shaft being arranged in a Z-shaped configuration; said first and second joint forks having rotary axes offset at 90° to one another.

3. A feeding apparatus for advancing sheets in a feeding plane and in a feeding direction to a sheet handling station situated downstream of the feeding apparatus; the feeding apparatus comprising
    (a) a first feeding device including
        (1) a first endless traction member having an upper run and a lower run;
        (2) first end rollers supporting said first traction member;
        (3) a first carrier pawl mounted on said first traction member for engaging a trailing edge of a sheet and advancing the sheet in the feeding direction; and
        (4) first drive means for circulating said first traction member and said first carrier pawl at a constant speed; and
    (b) a second feeding device being a continuation of said first feeding device and having an end situated downstream of said first feeding device as viewed in said feeding direction; said second feeding device including
        (1) a second endless traction member having an upper run and a lower run;
        (2) second end rollers supporting said second traction member;
        (3) a second carrier pawl mounted on said second traction member for engaging a trailing edge of a sheet and advancing the sheet in the feeding direction into the sheet handling station;
        (4) a second drive means for circulating said second traction member with a travelling speed having a speed value with which the sheet enters the sheet handling station; said speed value being at least as high as said constant speed of said first traction member; and
        (5) means for maintaining said second carrier pawl during travel thereof in a retracted position below said feeding plane from a location before a transition from a linear travel on said upper run to a location of an initial zone of a transitional circular travel of said second carrier pawl to said lower run.

4. A feeding apparatus for advancing sheets in a feeding plane and in a feeding direction to a sheet handling station situated downstream of the feeding apparatus; the feeding apparatus comprising
  (a) a first feeding device including
    (1) a first endless traction member having an upper run and a lower run;
    (2) first end rollers supporting said first traction member;
    (3) a first carrier pawl mounted on said first traction member for engaging a trailing edge of a sheet and advancing the sheet in the feeding direction; and
    (4) first drive means for circulating said first traction member and said carrier pawl at a constant speed; and
  (b) a second feeding device being a continuation of said first feeding device and having an end situated downstream of said first feeding device as viewed in said feeding direction; said second feeding device including
    (1) a second endless traction member having an upper run and a lower run;
    (2) second end rollers supporting said second traction member;
    (3) a carrier device mounted on said second traction member for engaging a trailing edge of a sheet and advancing the sheet in the feeding direction into the sheet handling station; said carrier device including a second carrier pawl;
    (4) means for maintaining said second carrier pawl during travel thereof in a retracted position below said feeding plane from a location before a transition from a linear travel on said upper run of said second endless traction member to a location of an initial zone of a transitional circular travel of said second carrier pawl to said lower run of said second endless traction member; and
    (5) a second drive means for circulating said second traction member and said carrier device with a periodically changing travelling speed having a minimum value at the most equal to said constant speed of said first traction member and a maximum value greater than said constant speed of said first traction member and at the most equal to an initial speed with which the sheet enters the sheet handling station; said initial speed being at least as high as said constant speed of said first traction member; said carrier device being situated on the upper run at the end of an acceleration phase of the periodic speed change.

5. The feeding apparatus as defined in claim 4, wherein one of said second end rollers includes a driven shaft; said second drive means includes a cardan shaft and a cardan joint coupling said cardan shaft to said driven shaft; said cardan shaft driving said driven shaft; said driven shaft being oriented at an acute angle to said cardan shaft.

6. The feeding apparatus as defined in claim 5, wherein said cardan joint is a first cardan joint having a first joint fork affixed to said cardan shaft; said second drive means further comprising a drive motor including a drive shaft and a second cardan joint coupling said cardan shaft to said drive shaft; said second cardan joint having a second joint fork affixed to said cardan shaft; said driven shaft, said cardan shaft and said drive shaft being arranged in a Z-shaped configuration; said first and second joint forks having rotary axes offset at 90° to one another.

* * * * *

UNITED STATES PATENT AND TRADEMARK OFFICE
CERTIFICATE OF CORRECTION

PATENT NO. : 5,375,827
DATED : December 27, 1994
INVENTOR(S) : Norbert Lentz et al It is certified that error appears in the above-indentified patent and that said Letters Patent is hereby corrected as shown below:

On the title page, item [73], the fifth word should read --beschränkter--.

Signed and Sealed this

Twenty-eight Day of February, 1995

Attest:

BRUCE LEHMAN

Attesting Officer

Commissioner of Patents and Trademarks